United States Patent
Oki et al.

(10) Patent No.: US 10,074,022 B2
(45) Date of Patent: Sep. 11, 2018

(54) LAMP DETECTION DEVICE AND LAMP DETECTION METHOD

(71) Applicant: Nissan Motor Co., Ltd., Yokohama-shi, Kanagawa (JP)

(72) Inventors: Takahiko Oki, Kanagawa (JP); Haruo Matsuo, Kanagawa (JP); Daiki Yamanoi, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/742,404

(22) PCT Filed: Jul. 8, 2015

(86) PCT No.: PCT/JP2015/069599
§ 371 (c)(1),
(2) Date: Jan. 5, 2018

(87) PCT Pub. No.: WO2017/006451
PCT Pub. Date: Jan. 12, 2017

(65) Prior Publication Data
US 2018/0197026 A1    Jul. 12, 2018

(51) Int. Cl.
*G06K 9/00* (2006.01)
*G06T 7/13* (2017.01)
*H04N 5/225* (2006.01)
*G08G 1/0962* (2006.01)

(52) U.S. Cl.
CPC ............ *G06K 9/00825* (2013.01); *G06T 7/13* (2017.01); *G08G 1/09623* (2013.01); *H04N 5/225* (2013.01)

(58) Field of Classification Search
CPC .. G06K 9/00825; G06T 7/13; G08G 1/09623; H04N 5/225
See application file for complete search history.

(56) References Cited

U.S. PATENT DOCUMENTS

| | | | |
|---|---|---|---|
| 6,611,610 B1 * | 8/2003 | Stam | B60Q 1/085 340/930 |
| 7,038,577 B2 * | 5/2006 | Pawlicki | H05K 999/99 340/435 |
| 7,512,252 B2 * | 3/2009 | Otsuka | B60Q 1/1423 382/104 |

(Continued)

FOREIGN PATENT DOCUMENTS

| JP | H05316361 A | 11/1993 |
|---|---|---|
| JP | 2005301518 A | 10/2005 |

(Continued)

*Primary Examiner* — Manav Seth
(74) *Attorney, Agent, or Firm* — Young Basile Hanlon & MacFarlane, P.C.

(57) ABSTRACT

A lamp detection device detects an edge portion from a camera image, the edge portion having a luminance difference equal to or above a predetermined value, and generates a smoothed image by diminishing the luminance difference of the edge portion. Then, the lamp detection device extracts synchronized pixels from the smoothed image, the synchronized pixels having luminances varying synchronously with an alternating current cycle of power supplied to a lamp, and detects the lamp from the synchronized pixels.

4 Claims, 7 Drawing Sheets

(56) References Cited

U.S. PATENT DOCUMENTS

| | | | | |
|---|---|---|---|---|
| 7,899,213 B2* | 3/2011 | Otsuka | ................ | B60Q 1/1423 |
| | | | | 348/113 |
| 9,171,217 B2* | 10/2015 | Pawlicki | .............. | H05K 999/99 |
| 9,193,355 B2* | 11/2015 | Ferguson | ............ | G08G 1/09623 |
| 9,473,718 B2* | 10/2016 | Kiyohara | ........... | G06K 9/00791 |
| 9,679,207 B2* | 6/2017 | Oki | .................... | G06K 9/00825 |
| 9,811,747 B2* | 11/2017 | Oki | ........................ | H04N 7/183 |
| 2010/0033571 A1* | 2/2010 | Fujita | .................... | B60W 40/02 |
| | | | | 348/149 |
| 2012/0050074 A1* | 3/2012 | Bechtel | .................... | B60R 1/04 |
| | | | | 340/988 |
| 2013/0142388 A1 | 6/2013 | Azuma | | |
| 2015/0103250 A1 | 4/2015 | Watanabe et al. | | |

FOREIGN PATENT DOCUMENTS

| | | | |
|---|---|---|---|
| JP | 2008134916 A | 6/2008 |
| JP | 2013097676 A | 5/2013 |
| JP | 2013258685 A | 12/2013 |

* cited by examiner

| 1/8 | 1/8 | 1/8 |
|---|---|---|
| 1/8 | 0 | 1/8 |
| 1/8 | 1/8 | 1/8 |

FIG. 3B

| 1/6 | 0 | 1/6 |
|---|---|---|
| 1/6 | 0 | 1/6 |
| 1/6 | 0 | 1/6 |

FIG. 3C

| 1/8 | 0 | 1/8 |
|---|---|---|
| 1/4 | 0 | 1/4 |
| 1/8 | 0 | 1/8 |

FIG. 3D

| 1/6 | 1/6 | 1/6 |
|---|---|---|
| 0 | 0 | 0 |
| 1/6 | 1/6 | 1/6 |

FIG. 3E

| 1/8 | 1/4 | 1/8 |
|---|---|---|
| 0 | 0 | 0 |
| 1/8 | 1/4 | 1/8 |

LAMP DETECTION DEVICE AND LAMP DETECTION METHOD

TECHNICAL FIELD

The present invention relates to a lamp detection device and a lamp detection method.

BACKGROUND

A traffic light detection device configured to detect a traffic light from an image shot with a camera has heretofore been known (see Japanese Patent Application Publication No. 2005-301518). According to Japanese Patent Application Publication No. 2005-301518, a signal lamp candidate is detected from an image based on a color and a shape of a signal lamp, and it is determined whether or not the signal lamp candidate blinks at a predetermined cycle.

When a vehicle that mounts a camera is moving, a position of an edge portion included in an image shot during the movement and having a luminance difference equal to or above a predetermined value also moves accordingly. This causes a step response of luminance in a region where the edge portion is moving, and generates noise having wide frequency components. When pixels with luminances varying at a predetermined cycle are extracted as a lamp, the noise having a wide frequency component is apt to be falsely recognized as such a lamp.

SUMMARY

The present invention has been made in view of the aforementioned problem. An object of the invention is to provide a lamp detection device and a lamp detection method, which are capable of stably detecting a lamp while suppressing false detection of a step response of luminance as a lamp even in the case of a movement of an edge portion.

A lamp detection device according to one aspect of the present invention detects an edge portion from a camera image, the edge portion having a luminance difference equal to or above a predetermined value, and generates a smoothed image by diminishing the luminance difference of the edge portion. Then, the lamp detection device extracts synchronized pixels from the smoothed image, the synchronized pixels having luminances varying synchronously with an alternating current cycle of power supplied to a lamp, and detects the lamp from the synchronized pixels.

One aspect of the present invention reduces a luminance gradient representing a luminance difference between adjacent pixels at the edge portion, thereby reducing the luminance difference in a step response of luminance of a pixel attributed to positional shift of the edge portion on an image and reducing noise intensity in a power frequency band. Thus, it is possible to detect a lamp stably while suppressing false detection of the noise attributed to the step response of luminance of the pixel as the lamp.

DETAILED DESCRIPTION OF THE EMBODIMENTS

First Embodiment

Next, embodiments of the present invention will be described in detail with reference to the drawings.

An overall configuration of a lamp detection device according to a first embodiment will be described with reference to FIG. 1. A traffic light detection device includes an image shooting unit 11 mounted on a vehicle and configured to acquire a camera image by shooting an image around the vehicle, an image processing unit 12 configured to detect a lamp by using the camera image acquired by the image shooting unit 11, and a map data base.

The image shooting unit 11 is a digital camera which includes solid-state image sensing devices (image sensors) such as CCD and CMOS, and is configured to acquire an image-processible camera image. The image shooting unit 11 acquires successive camera images by shooting images in front of the vehicle, for example, repeatedly at given time intervals. The image shooting unit 11 shoots images multiple times during one alternating current cycle of a system power source to be supplied to the lamp. The image shooting unit 11 can capture the lamp located in front of the vehicle in each camera image. In other words, the image sensors have sensitivity at least enough to detect the lamp.

Here, the "lamp" is an artificial light source that emits light along with the supply of the system power source, and includes a signal lamp in a traffic light, a light-emitting road sign, and any other electric lamp (a light-emitting signboard, and a light-emitting part of a vending machine or the like).

The image processing unit 12 receives data of the camera images acquired by the image shooting unit 11 and detects the type of the lamp included in the camera images. Information on the detected lamp is forwarded to another processing unit (a vehicle CPU 16) mounted on the vehicle, which includes a controller for realizing autonomous driving of the vehicle, for example. The image processing unit 12 is formed from a microcontroller including a CPU, a memory, and an input-output unit, for instance, and composes multiple information processing circuits provided in the lamp detection device by executing a computer program installed in advance. The image processing unit 12 executes a sequence of an information processing cycle (including edge detection processing, edge smoothing processing, and power synchronization processing) to detect the lamp from a camera image repeatedly for each of the successive camera images. The image processing unit 12 may also serve as an ECU used for other control related to the vehicle.

The multiple information processing circuits composed of the image processing unit 12 include an edge detection circuit 21, an edge smoothing circuit 22, a reference signal setting circuit 23, a synchronized image generation circuit 24, and a lamp detection circuit 26.

Figure 2A:
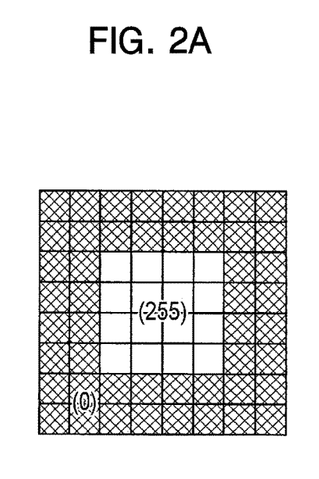
FIG. 2A shows a camera image.
Figure 2B:
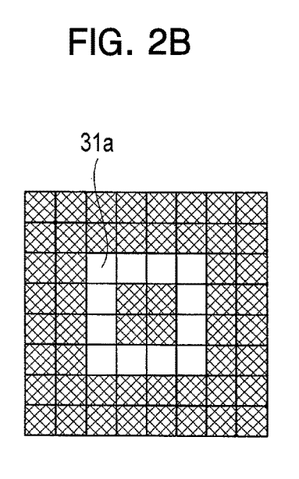
FIG. 2B shows an edge portion detected from FIG. 2A.

The edge detection circuit 21 detects an edge portion from each camera image. Here, each edge portion has a luminance difference between adjacent pixels equal to or above a predetermined value. For example, the edge detection circuit 21 detects an edge portion 31a shown in FIG. 2B from a camera image shown in FIG. 2A. Values (0) and (255) in FIG. 2A represent luminance values (in eight bits), respectively. The value (0) represents black while the value (255) represents white. Grids in FIG. 2A represent pixels. A portion that develops a luminance difference between adjacent pixels in an amount equal to or above a predetermined threshold is detected as the edge portion 31a by the edge detection circuit 21. A portion in FIG. 2A where the luminance value (0) abuts on the luminance value (255) is detected as the edge portion 31a. The edge portion 31a shown in FIG. 2B is formed of a total of sixteen consecutive pixels in a square shape defined by four longitudinal pixels and four lateral pixels. When a high-luminance region of the edge portion moves on the camera image, the luminance of the pixel to which the edge portion moves varies in a step-response fashion. As a consequence, the luminance value emerges as noise in a wide frequency band. If the noise occurs in a frequency band of the alternating current cycle of the power supplied to the lamp, the noise is also extracted as a synchronized pixel in which the luminance varies synchronously. Therefore, the predetermined value serving as the predetermined threshold is set based on the luminance difference of the edge portion that develops the noise prone to be extracted as the synchronized pixel.

A method of edge detection is not limited to a specific method, and existing techniques can be used therein. For example, it is possible to use the Sobel operator, the Prewitt operator, and the Canny edge detector.

The edge smoothing circuit 22 generates a smoothed image by diminishing the luminance difference of the edge portion 31a in the camera image. For example, the edge smoothing circuit 22 generates a smoothed image shown in FIG. 2C by purposely diminishing the luminance difference of the edge portion 31a in the camera image shown in FIG. 2A. At this time, the luminance difference is purposely diminished so as to reduce a luminance gradient representing the luminance difference between the adjacent pixels at the edge portion 31a in the camera image of FIG. 2B. In one instance, the edge smoothing circuit 22 adjust the respective luminances of the total of sixteen pixels constituting the edge portion 31a shown in FIG. 2B in accordance with smoothing processing shown below. The luminance difference of the edge portion 31a is diminished so as to eliminate the occurrence of the noise to be extracted as the synchronized image.

Figure 2C:
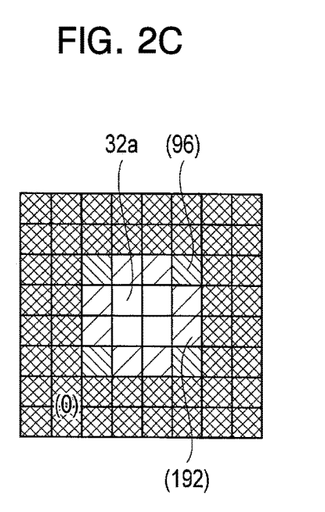
FIG. 2C shows a smoothed image generated by adjusting a luminance at the edge portion of FIG. 2B.
Figure 3A:
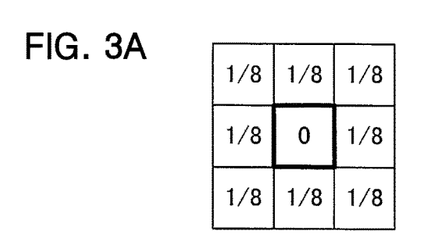
FIG. 3A is a diagram showing an example of smoothing processing to adjust a luminance of a pixel at the center by using luminances of eight surrounding pixels.

In FIG. 3A, the pixel at the center marked "0" corresponds to the pixel that constitutes the edge portion 31a. According to the method in FIG. 3A, the luminance of this pixel is adjusted to an average value of luminances of the surrounding eight pixels. This processing is performed on each of the sixteen pixels constituting the edge portion 31a. Accordingly, as shown in FIG. 2C, the luminances of the eight pixels constituting the four sides of the edge portion 31a are adjusted to a value (192) while the luminances of the four pixels constituting the four corners of the edge portion 31a are adjusted to a value (96). In this way, the luminance difference of the camera image of FIG. 2A is diminished so as to reduce the luminance gradient representing the luminance difference between the adjacent pixels at the edge portion 31a, whereby the smoothed image of FIG. 2C is generated. A group of pixels defined by two longitudinal pixels and two lateral pixels, which are not subjected to the luminance adjustment and surrounded by the eight pixels that have been subjected to the luminance adjustment, constitute a region 32a for detecting the lamp.

Figure 3B:
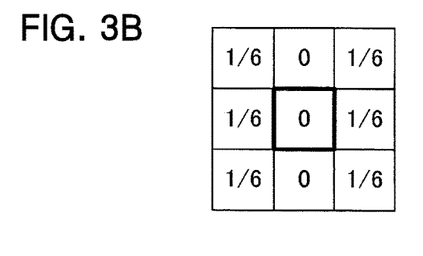
FIGS. 3B and 3C are diagrams showing an example of smoothing processing to adjust a luminance of a pixel at the center by using luminances of six surrounding pixels, which represent smoothing processing of edge subportions that extend in a longitudinal direction.
Figure 3C:
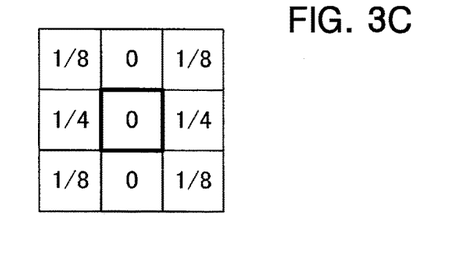
Figure 3D:
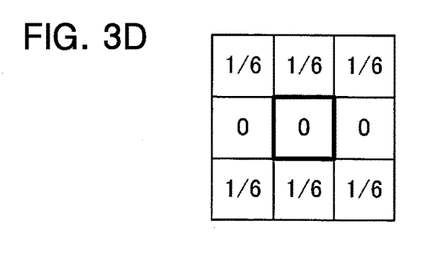
FIGS. 3D and 3E are diagrams showing an example of smoothing processing to adjust a luminance of a pixel at the center by using luminances of six surrounding pixels, which represent smoothing processing of edge subportions that extend in a lateral direction.
Figure 3E:
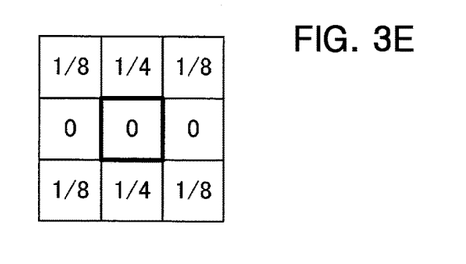

Meanwhile, FIGS. 3B and 3C show an example of subjecting edge subportions that extend in a longitudinal direction to the smoothing processing, and FIGS. 3D and 3E show an example of subjecting edge subportions that extend in a lateral direction to the smoothing processing. In other words, regarding the edge portion 31a of FIG. 2B, an edge subportion extending a vertical direction may undergo the smoothing processing in a different way from the smoothing processing to be performed on an edge subportion extending in a horizontal direction. Alternatively, only one of the edge subportion extending in the horizontal direction and the edge subportion extending in the vertical direction may be subjected to the smoothing processing depending on a moving direction of the image as described later.

The synchronized image generation circuit 24 (a synchronized pixel extraction circuit) extracts synchronized pixels from the smoothed image, in which the luminances vary synchronously with the alternating current cycle of the power supplied to the lamp, and then generates a synchronized image composed of the synchronized pixels. The reference signal setting circuit 23 sets a reference signal used for extracting the synchronized pixels.

Figure 4:
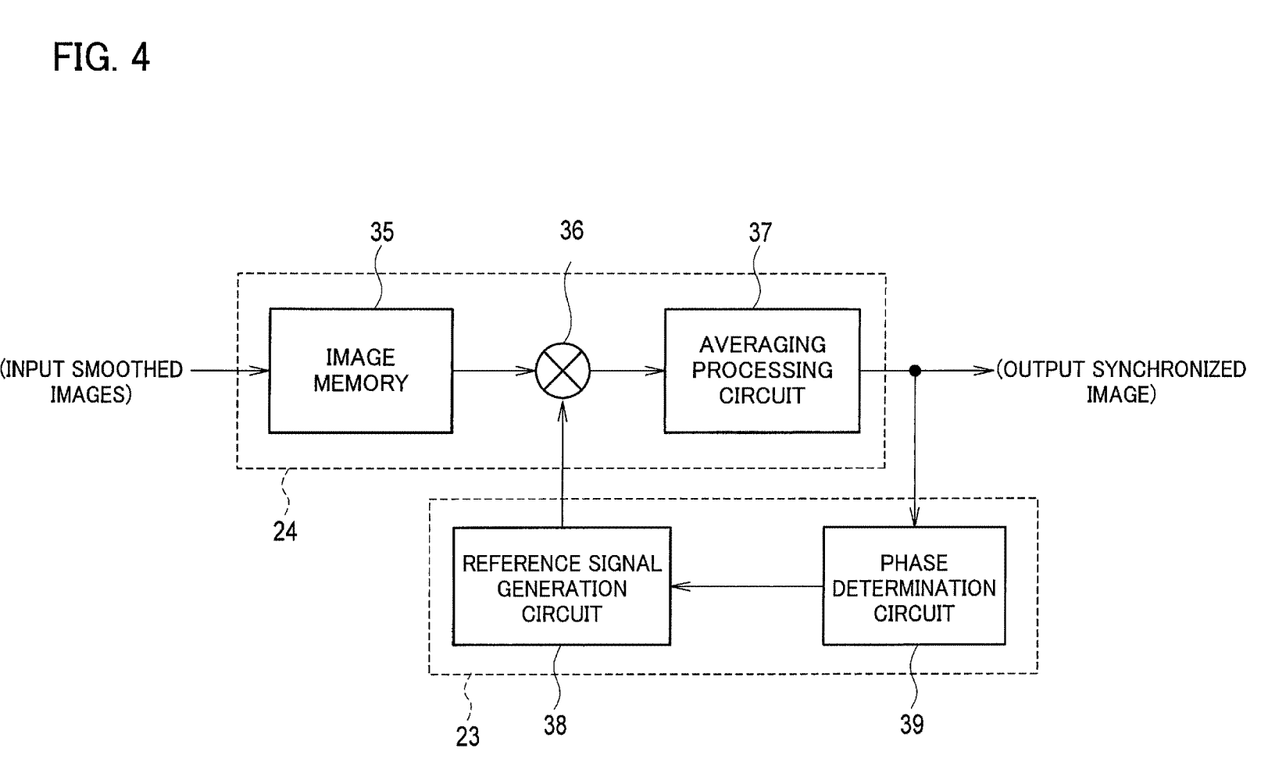
FIG. 4 is a block diagram showing detailed configurations of a synchronized image generation circuit 24 and a reference signal setting circuit 23.

As shown in FIG. 4, the synchronized image generation circuit 24 includes an image memory 35, a multiplication circuit 36, and an averaging processing circuit 37. The reference signal setting circuit 23 includes a reference signal generation circuit 38 and a phase determination circuit 39. First, the reference signal generation circuit 38 acquires frequency information on the system power source (a commercial power source) around the vehicle by using own vehicle position information 14 shown in FIG. 1, and generates a reference signal of which intensity varies at a cycle (100 Hz, for instance) of alternating current power obtained by subjecting the system power source to full-wave rectification. Here, the own vehicle position information 14 can be obtained from a positioning signal such as a GPS signal, or positional information on a landmark captured in the camera image.

The multiplication circuit 36 reads out the smoothed image stored in the image memory 35 and extracts synchronized pixels by multiplying the smoothed image by the reference signal. The multiplication circuit 36 executes the above-described multiplication processing on each of the multiple smoothed images stored simultaneously in the image memory 35. The averaging processing circuit 37 obtains an average value of the results of multiplication of the respective smoothed images by the multiplication circuit 36, and outputs the average value as the synchronized image composed of the synchronized pixels.

Here, the phase determination circuit 39 determines whether or not a phase of the reference signal is synchronized with a phase of a variation in luminance of the smoothed images, and feeds a result of the determination back to the reference signal generation circuit 38. Upon receipt of the feedback, the reference signal generation circuit 38 adjusts the phase of the reference signal in such a way as to synchronize the phase of the reference signal with the variation in luminance of the smoothed images. Specifically, the phase of the reference signal is adjusted such that the result of multiplication by the multiplication circuit 36, that is, the luminance of each synchronized pixel takes the largest value. This feedback control makes it possible to increase the luminance of the synchronized image.

The power supplied to the lamp is the alternating current power obtained by subjecting the power of the commercial power source to the full-wave rectification. The luminance of the lamp lit by receiving the power supply from the commercial power source varies in a cycle which is the same as the cycle (such as 100 Hz) of the full-wave rectified alternating current power. The synchronized pixels of which luminances vary synchronously with the alternating current cycle of the power supplied to the lamp can be extracted from the smoothed images.

In this embodiment, the luminance difference of the edge portion is diminished so as to reduce the luminance gradient representing the luminance difference between the adjacent pixels at the edge portion, and the synchronized pixels of which luminances vary synchronously with the alternating current cycle of the power are extracted thereafter. Thus, a space frequency is less likely to be mixed in the case of synchronization detection of a time frequency even in a situation of special movement of the high-luminance region, and it is possible to reduce the noise included in the synchronized image.

The lamp detection circuit 26 detects a position of the lamp on the synchronized image by determining the synchronized pixels in the synchronized image having the higher luminances than a predetermined luminance threshold as the lamp. Then, the type of the lamp is detected by using at least one of the synchronized image, an edge image, and the camera image. For example, the lamp detection circuit 26 uses pattern matching to determine whether or not the shape of the lamp is similar to that of a light-emitting road sign. Then, the lamp detection circuit 26 determines whether or not a color phase at a position in the camera image corresponding to the position of the lamp is similar to a color of a lamp in a traffic light. These determination functions make it possible to determine whether the lamp is a signal lamp in a traffic light, a light-emitting road sign, or any other electric lamp.

Figure 5:
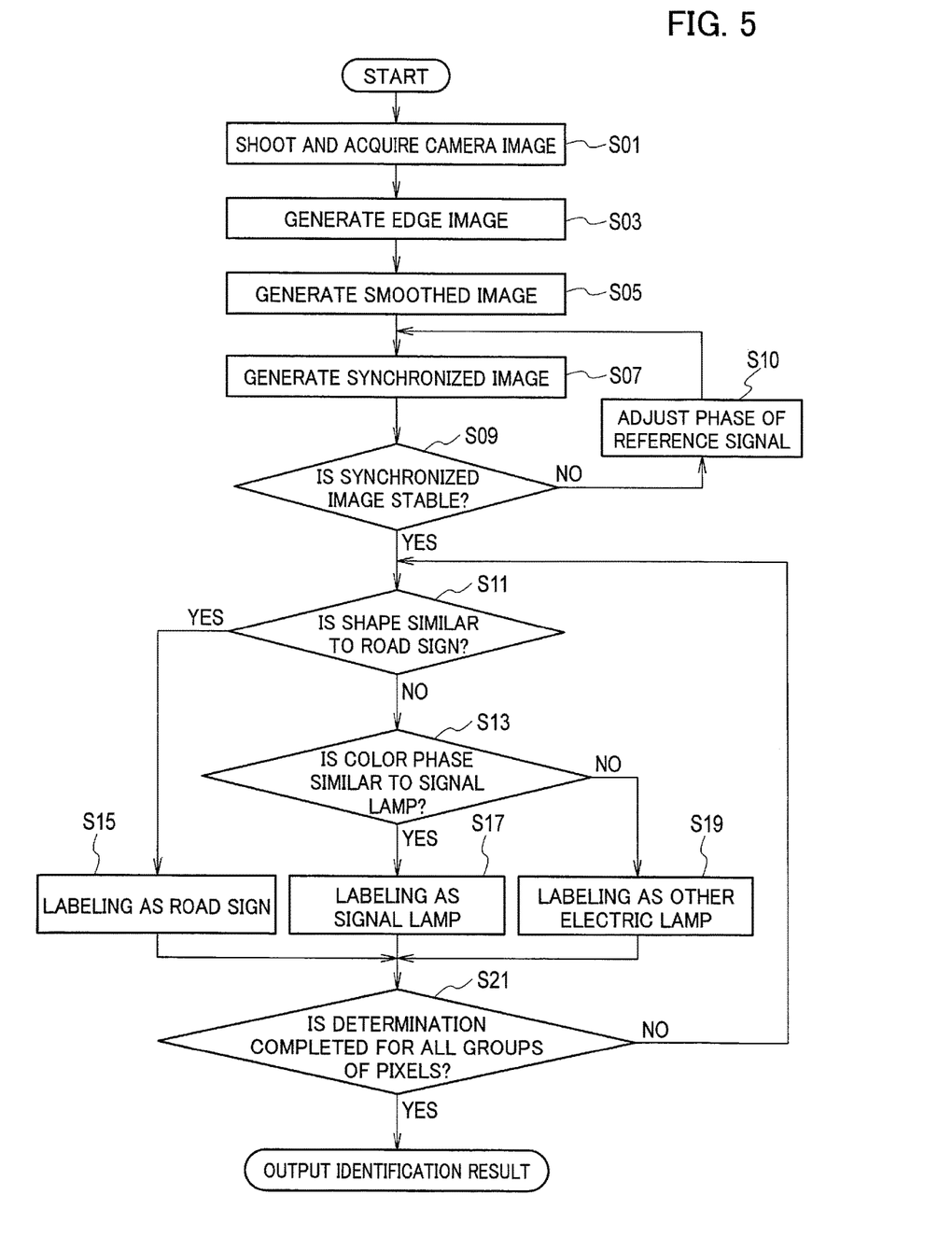
FIG. 5 is a flowchart showing an example of a lamp detection method using the lamp detection device of FIG. 1.

An example of a lamp detection method using the lamp detection device of FIG. 1 will be described with reference to a flowchart of FIG. 5.

First, in step S01, the image shooting unit 11 acquires the camera images successively. The multiple camera images thus acquired are stored in the memory. The processing proceeds to step S03 after acquisition of six camera images, for example, during one alternating current cycle of the system power source. The edge detection circuit 21 detects the edge portion 31a (FIG. 2B) having the luminance difference equal to or above the predetermined value from the camera image (FIG. 2A) by using the Sobel operator or the Prewitt operator, for example.

Next, the processing proceeds to step S05. As described with reference to FIGS. 2A to 2C and 3A to 3E, the edge smoothing circuit 22 generates the smoothed image (FIG. 2C) by diminishing the luminance difference in the camera image so as to reduce the luminance gradient representing the luminance difference between the adjacent pixels at the edge portion 31a.

The processing proceeds to step S07 where the synchronized image generation circuit 24 extracts the synchronized pixels, in which the luminances vary synchronously with the alternating current cycle of the power supplied to the lamp, from the smoothed images and then generates the synchronized image composed of the synchronized pixels. The processing proceeds to step S09 where the phase determination circuit 39 determines whether or not the phase of the reference signal is synchronized with the variation in luminance of the smoothed images by referring to the synchronized image. For example, when an average luminance value of the entire synchronized image is below a predetermined value, the phase determination circuit 39 determines that there is no synchronization (NO in step S09), and feeds the result of the determination back to reference signal generation circuit 38. Upon receipt of the feedback, the reference signal generation circuit 38 adjusts the phase of the reference signal in such a way as to synchronize the phase of the reference signal with the variation in luminance of the smoothed images (step S10).

In the case of the determination that there is the synchronization (YES in step S09), the processing proceeds to step S11 where the lamp detection circuit 26 detects the position of the lamp on the synchronized image by determining a cluster of the synchronized pixels (the group of pixels) in the synchronized image, which have the higher luminances than the predetermined luminance threshold, as the lamp. The lamp detection circuit 26 uses the pattern matching to determine whether or not the shape of the lamp (the group of pixels) is similar to that of the light-emitting road sign. When the shape is similar to that of the light-emitting road sign (YES in step S11), the lamp detection circuit 26 labels the lamp (the group of pixels) as the light-emitting road sign (step S15), and the processing proceeds to step S21.

When the shape is not similar to that of the light-emitting road sign (NO in step S11), the lamp detection circuit 26 determines whether or not the color phase at the position in the camera image corresponding to the position of the lamp is similar to the color of the lamp in the traffic light (step S13). When the color phase is similar to the color of the lamp in the traffic light (YES in step S13), the lamp detection circuit 26 labels the lamp (the group of pixels) as the signal lamp in the traffic light (step S17), and the processing proceeds to step S21. When the color phase is not similar to the color of the lamp in the traffic light (NO in step S13), the lamp detection circuit 26 labels the lamp (the group of pixels) as another electric lamp (step S19), and the processing proceeds to step S21.

When the type determination of all the groups of pixels in the synchronized image, each of which is determined as the lamp, is yet to be completed (NO in step S21), the processing returns to step S11 and the type determination is performed on the group of pixels (the lamp) not subjected to the determination yet. After the type determination of all the groups of pixels (the lamps) is completed (YES in step S21), the lamp detection device forwards the information on the detected lamps to the vehicle CPU 16.

As described above, the following operation and effects are obtained according to the first embodiment.

In the first embodiment, the luminance difference of the edge portion is purposely diminished (S05) so as to reduce the luminance gradient representing the luminance difference between the adjacent pixels at the edge portion, and the synchronized pixels in which the luminances vary synchronously with the alternating current cycle of the power are extracted thereafter (S07). The luminance gradient representing the luminance difference between the adjacent pixels at the edge region is thus smoothed. When the high-luminance region of the edge portion moves on the camera image, the luminance of the pixel to which the edge portion moves varies in a step-response fashion. As a consequence, the luminance value emerges as the noise in the wide frequency band. The amount of noise grows larger as the variation in luminance due to the movement is larger or as a movement speed is faster. If the noise occurs in the frequency band of the alternating current cycle of the power supplied to the lamp, the noise is also extracted as the synchronized pixel in which the luminance varies synchronously. Accordingly, the diminishment of the luminance difference of the edge portion so as to reduce the luminance gradient representing the luminance difference between adjacent pixels at the edge portion reduces the chance of false detection of the noise as the synchronized pixel, which is attributed to the step response of luminance of the pixel along with the movement of the edge portion at the position of the image. Thus, the noise included in the synchronized image is reduced so that the lamp can be detected stably.

Modified Examples

Regarding the edge portion to be subjected to the edge detection and the smoothing processing, the first embodiment (FIG. 2A-2C) does not restrict the extending direction (horizontal or vertical) thereof. In an actual traveling environment where the vehicle is traveling, its vehicle body shakes up and down. Accordingly, an amount of movement of an edge subportion in the vertical direction becomes larger than that in the horizontal direction. In this regard, of the multiple edge subportions, only the edge subportions that are consecutive in the horizontal direction may be subjected to the diminishment of the luminance difference in order to efficiently remove the noise while reducing the image processing load.

Figure 1:
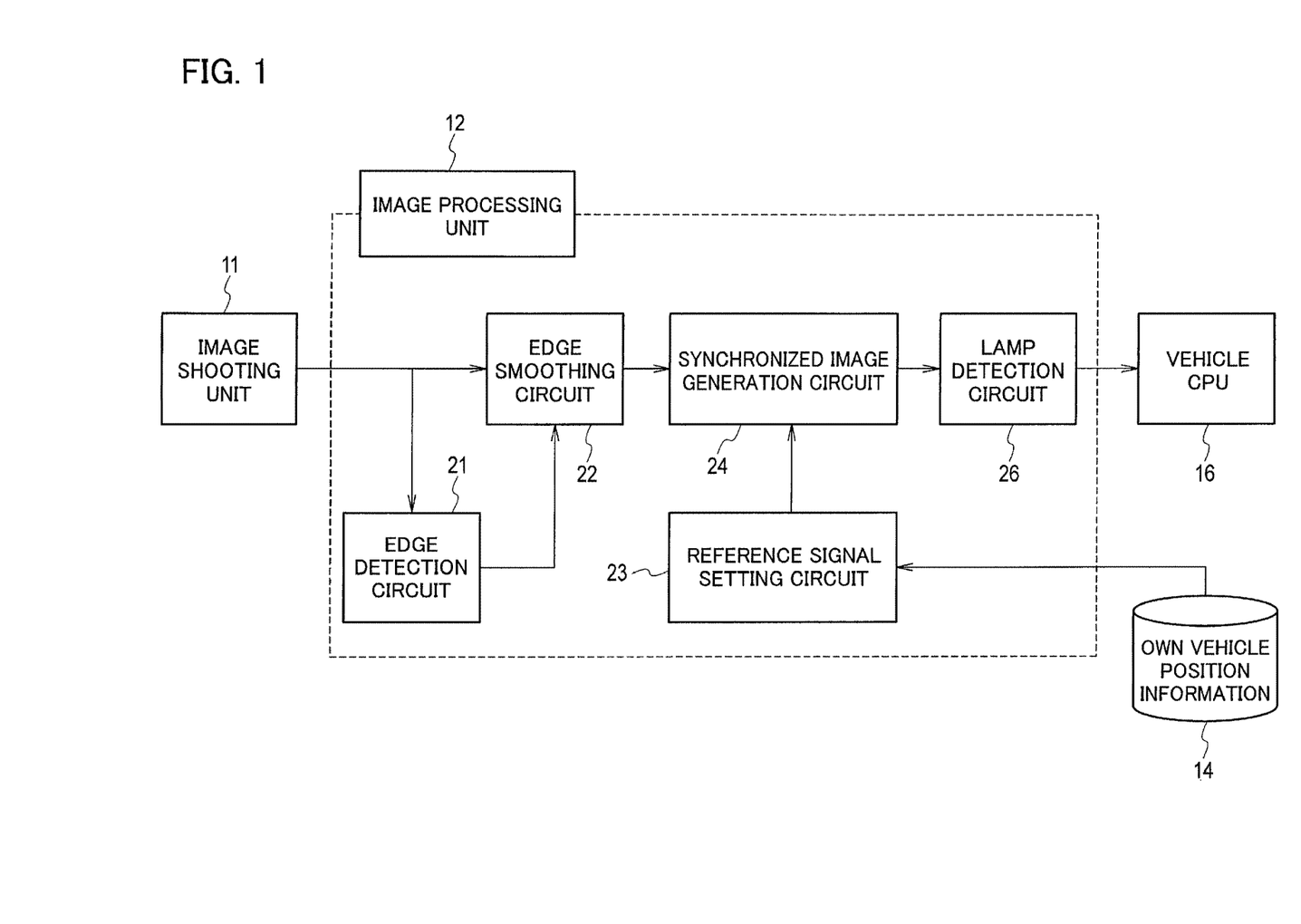
FIG. 1 is a block diagram showing an overall configuration of a lamp detection device according to a first embodiment.

For example, the edge smoothing circuit 22 of FIG. 1 may diminish the luminance difference of only the edge subportions 31a that are consecutive in the horizontal direction out of the edge portion 31a detected by the edge detection circuit 21 and shown in FIG. 2B, in such a way as to reduce the luminance gradient representing the luminance difference between the adjacent pixels. It is possible to perform the smoothing processing only the edge subportions 31a of the edge portion 31a which are consecutive in the horizontal direction, for example, by using matrices of FIGS. 3D and 3E. This makes it possible to generate the smoothed image as shown in FIG. 2F.

Figure 2D:
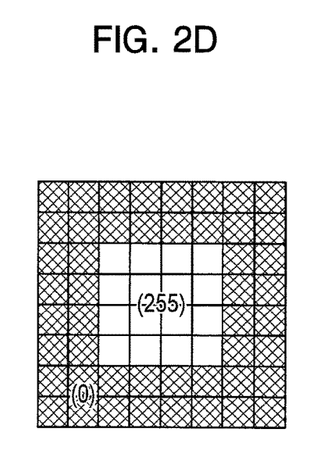
FIG. 2D shows a camera image.
Figure 2E:
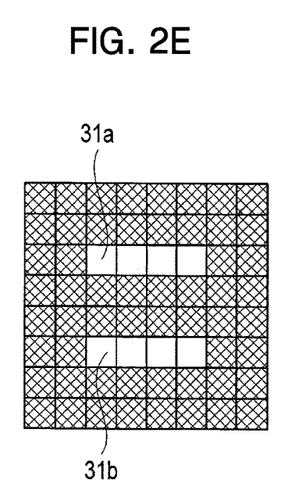
FIG. 2E shows edge subportions consecutive in a horizontal direction which are detected from FIG. 2D.
Figure 2F:
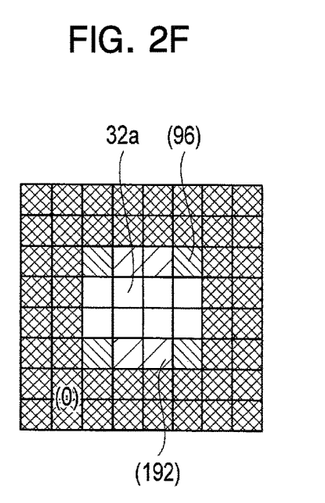
FIG. 2F shows a smoothed image generated by adjusting luminances at the edge portion.

Alternatively, the edge detection circuit 21 of FIG. 1 may detect only edge subportions 31b, which are consecutive in the horizontal direction, from the camera image of FIG. 2D. In this case, the edge smoothing circuit 22 can perform the smoothing processing on all the edge subportions 31b detected by the edge detection circuit 21. The smoothed image as shown in FIG. 2F can be generated. In FIG. 2F, a group of pixels defined by two longitudinal pixels and four lateral pixels, which are not subjected to the luminance adjustment, constitute a region 32b for detecting the lamp. The detection region 32b of FIG. 2F is wider than the detection region 32a of FIG. 2C obtained by smoothing two edges in the horizontal direction and two edges in the vertical direction, because the edge subportions extending in the vertical direction are not smoothed and remain unchanged from the camera image.

The luminance gradient representing the luminance difference between the adjacent pixels at the edge subportions out of the edge portion, which are consecutive in the horizontal direction, is reduced. In this way, the edge subportions consecutive in the vertical direction are kept from being smoothed, and can thus remain as the region for detecting the lamp. Accordingly, a lamp which is low in luminance and far from the vehicle can be detected with high sensitivity while efficiently reducing the noise at the edge portion. In the meantime, the image processing load concerning the edge detection or the edge smoothing is reduced as well.

Second Embodiment

As a velocity of a positional shift of an edge portion in a camera image is increased, noise is more likely to occur in a region to which the edge portion shifts. The noise is less likely to occur when the positional shift of the edge portion in the camera image has a low velocity. In this case, it is preferable to ensure the wide detection region while leaving the edge portion intact without smoothing. A second embodiment will describe a lamp detection device and a lamp detection method, which are designed to determine a necessity of noise reduction depending on a variation velocity of an edge portion in a camera image.

Figure 6:
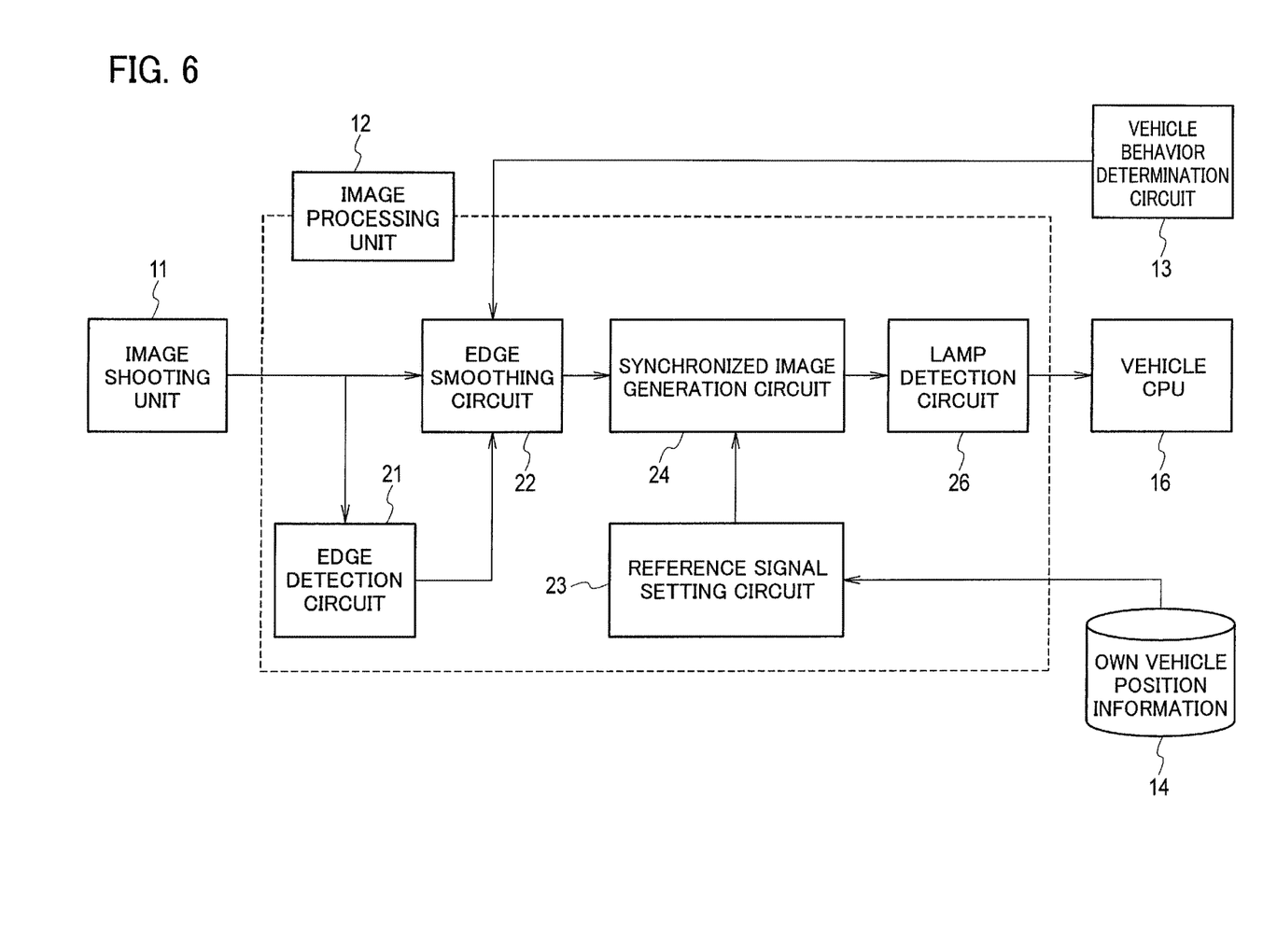
FIG. 6 is a block diagram showing an overall configuration of a lamp detection device according to a second embodiment.

As shown in FIG. 6, the lamp detection device according to the second embodiment is different from FIG. 1 in that the device further includes a vehicle behavior determination circuit 13. As with the image processing unit 12, the vehicle behavior determination circuit 13 is formed from a microcontroller, for example, which constitutes the vehicle behavior determination circuit 13 by executing the computer program installed in advance.

The vehicle behavior determination circuit 13 determines whether or not a velocity of a positional shift of the edge portion in the camera image is equal to or above a reference value. The reference value is a value serving as a reference for determining a necessity to subject the edge portion to the smoothing processing, and this is a predetermined value. The vehicle behavior determination circuit 13 can estimate the velocity of the positional shift of the edge portion in the camera image based on pitching information and suspension stroke information on the vehicle obtained from electronic stability control (ESC) via CAN communication.

Figure 7:
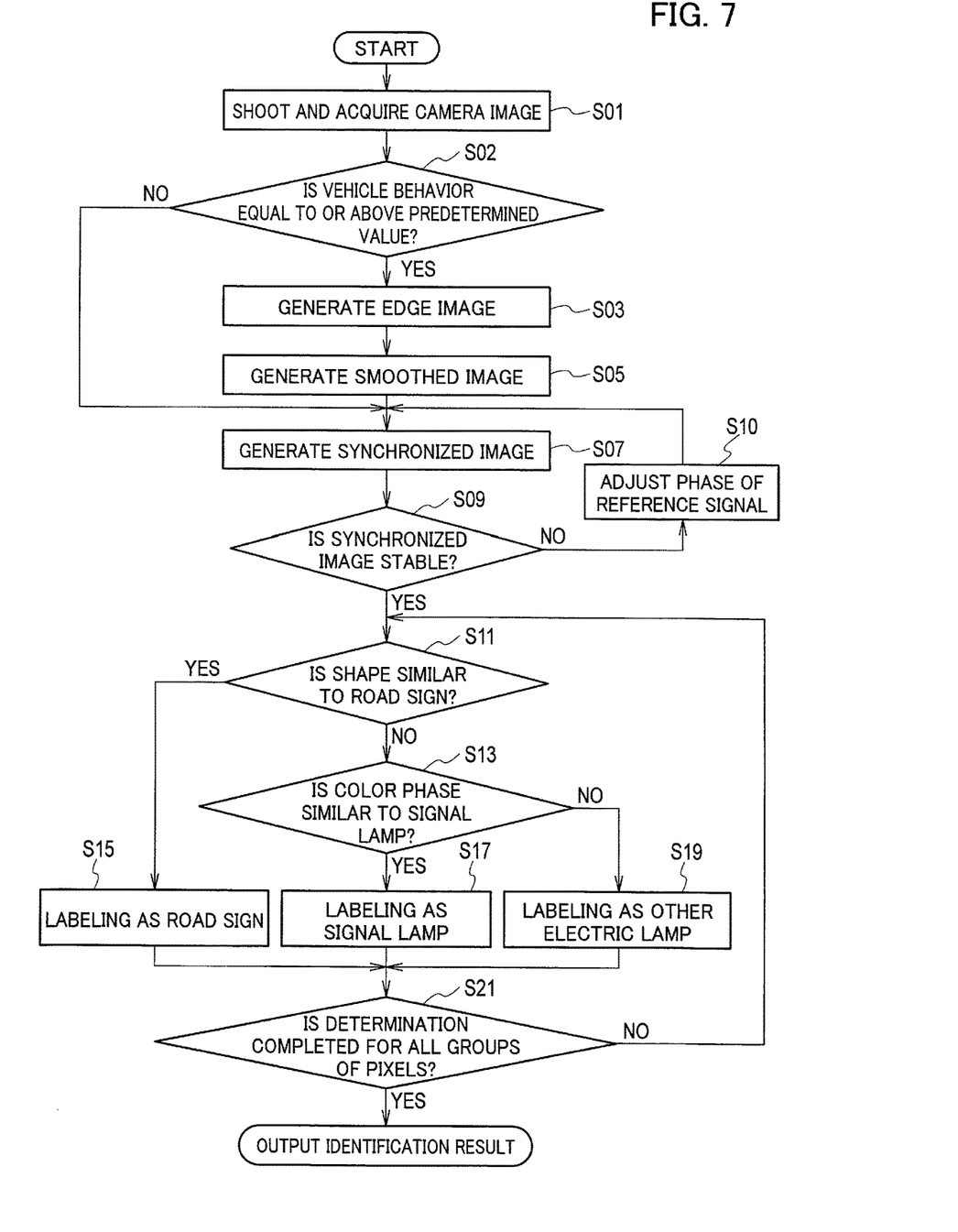
FIG. 7 is a flowchart showing an example of a lamp detection method using the lamp detection device of FIG. 6.

FIG. 7 shows an example of a lamp detection method using the lamp detection device of FIG. 6. When the velocity of the positional shift of the edge portion in the camera image is equal to or above the reference value (YES in step S02), the edge detection step (S03) and the smoothing step (S05) are conducted in a similar manner to those in the first embodiment. On the other hand, when the velocity of the positional shift of the edge portion is below the reference value (NO in step S02), the synchronized image generation circuit 24 may generate the synchronized image directly from the camera image (step S07) without conducting the edge detection or the smoothing. The remaining procedures are the same as those in FIG. 5.

The noise is more likely to occur when the velocity of the positional shift of the edge portion in the camera image grows larger. Therefore, when the velocity of the positional shift of the edge portion in the camera image is equal to or above the reference value, the synchronized pixels are extracted from the smoothed image in order to reduce the occurrence of the noise. On the other hand, the noise does not occur very much when the velocity falls below the reference value. Hence, the synchronized pixels are extracted from the camera image. As described above, the necessity of the noise reduction is determined depending on the velocity of the positional shift of the edge portion in the camera image. Thus, it is possible to reduce the load of the image processing from the camera image to the smoothed image, and to efficiently reduce the noise attributed to the edge portion.

While the present invention has been described above with reference to the embodiments, it should not be understood that the statements and the drawings constituting part of this disclosure intend to limit the present invention. Various alternative embodiments, examples, and operation techniques will be obvious to a person skilled in the art from this disclosure.

REFERENCE SIGNS LIST 11 image shooting unit
13 vehicle behavior determination circuit
21 edge detection circuit
22 edge smoothing circuit
23 reference signal setting circuit
24 synchronized image generation circuit (synchronized pixel extraction circuit)
26 lamp detection circuit
31a, 31b edge portion

The invention claimed is:

1. A lamp detection device comprising:
   an image shooting unit mounted on a vehicle and configured to acquire a camera image by shooting an image around the vehicle;
   an edge detection circuit configured to detect an edge portion from the camera image, the edge portion having a luminance difference equal to or above a predetermined value;
   an edge smoothing circuit configured to generate a smoothed image by diminishing the luminance difference between adjacent pixels at the edge portion;
   a synchronized pixel extraction circuit configured to extract synchronized pixels from the smoothed image, the synchronized pixels having luminances varying synchronously with an alternating current cycle of power supplied to a lamp; and
   a lamp detection circuit configured to detect the lamp from the synchronized pixels.

2. The lamp detection device according to claim 1, wherein the edge smoothing circuit diminishes the luminance difference only of edge subportions in the edge portion which are consecutive in a horizontal direction.

3. The lamp detection device according to claim 1, further comprising:
   a vehicle behavior determination circuit configured to determine whether or not a velocity of a positional shift of the edge portion in the camera image is equal to or above a reference value, wherein
   the synchronized pixel extraction circuit extracts the synchronized pixels having the luminances varying synchronously with the alternating current cycle of the power supplied to the lamp, from the smoothed image when the velocity of the positional shift of the edge portion is equal to or above the reference value, and
   the synchronized pixel extraction circuit extracts the synchronized pixels having the luminances varying synchronously with the alternating current cycle of the power supplied to the lamp, from the camera image when the velocity of the positional shift of the edge portion is below the reference value.

4. A lamp detection method comprising:
   acquiring a camera image by shooting an image around a vehicle while using an image shooting unit mounted on the vehicle;
   detecting an edge portion from the camera image, the edge portion having a luminance difference equal to or above a predetermined value;
   generating a smoothed image by diminishing the luminance difference between adjacent pixels at the edge portion;
   extracting synchronized pixels from the smoothed image, the synchronized pixels having luminances varying synchronously with an alternating current cycle of power supplied to a lamp; and
   detecting the lamp from the synchronized pixels.

* * * * *